United States Patent [19]

Schiller

[11] Patent Number: 4,618,988
[45] Date of Patent: Oct. 21, 1986

[54] MATCHER

[75] Inventor: Michael Schiller, Riverdale, N.Y.

[73] Assignee: Fingermatrix, Inc., North White Plains, N.Y.

[21] Appl. No.: 634,410

[22] Filed: Jul. 25, 1984

[51] Int. Cl.⁴ ............................................... G06K 9/00
[52] U.S. Cl. ............................................ 382/5; 382/36
[58] Field of Search .................................. 382/5, 36, 4

[56] References Cited

U.S. PATENT DOCUMENTS

| | | | |
|---|---|---|---|
| 3,601,803 | 8/1971 | Ullmann et al. | 382/36 |
| 3,755,780 | 8/1973 | Sammon et al. | 382/36 |
| 4,210,899 | 7/1980 | Swonger et al. | 382/5 |
| 4,307,376 | 12/1981 | Miller et al. | 382/36 |

Primary Examiner—Anthony V. Ciarlante
Attorney, Agent, or Firm—McAulay, Fields, Fisher, Goldstein & Nissen

[57] ABSTRACT

In a matcher mechanism for verifying a match of a set of subject points having positional parameters against a set of reference points having positional parameters, the improvement of employing a set of Group tables derived from the difference table. Each line entry on the difference table constitutes a lead entry of a separate Group table. The Group table are overlapping subsets of the entries on the difference table. The members of the Group table are limited to only one line entry representing each reference point. That line entry is the one which is closest to the lead entry on the difference plane. In addition, all line entries within a Group are limited to those that are within a predetermined window on the difference plane around the lead line entry for the group. A quality score is determined for each of the Group tables based on a weighted proximity value between each pair of line entries in the Group involved. The closer a pair of line entries are to each other, the greater will be its weighted score and its contribution to the weighted proximity value for the Group table. That Group table with the greatest quality score is deemed to provide the quality score for the matcher. A match is determined if the value of that quality score exceeds a threshold which is a function of the number of reference identification points. There may also be a requirement that the quality score exceeds some minimum value.

49 Claims, 11 Drawing Figures

DIFFERENCE TABLE

| Entry | ΔX | ΔY | Reference Point $R_i$ | Subject Point $S_j$ | Reference Set (RS) |
|---|---|---|---|---|---|
| 1 | 16 | -19 | $R_1$ | $S_1$ | 1 |
| 2 | 07 | -13 | $R_2$ | $S_2$ | 2 |
| 3 | 12 | -14 | $R_3$ | $S_3$ | 3 |
| 4 | 17 | -16 | $R_3$ | $S_2$ | |
| 5 | 18 | -19 | $R_4$ | $S_4$ | 4 |
| 6 | 06 | -6 | $R_5$ | $S_5$ | 5 |
| 7 | 11 | -8 | $R_5$ | $S_6$ | |
| 8 | 9 | -5 | $R_6$ | $S_6$ | 6 |
| 9 | 14 | -7 | $R_6$ | $S_7$ | |
| 10 | 13 | -14 | $R_6$ | $S_8$ | |
| 11 | 11 | -11 | $R_7$ | $S_9$ | 7 |
| 12 | 7 | -10 | $R_8$ | $S_{10}$ | 8 |

Fig. 2

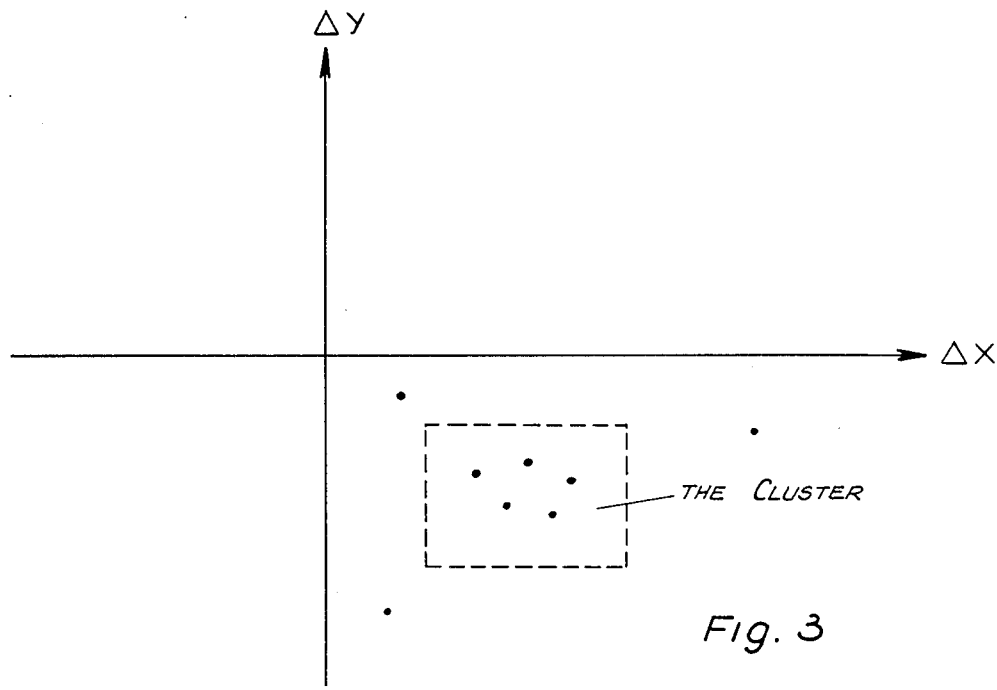

MATCHER

BACKGROUND OF THE INVENTION

This invention relates in general to an automatic computer controlled technique for matching a set of points in a reference file against a set of points in a subject file wherein each of the points in the reference file and the subject file have values associated with certain predetermined parameters. More particularly, this invention relates to a fingerprint matcher in which the positional and angular parameters of a set of minutia points in a reference file are compared against the positional and angular parameters of a set of minutia points in a subject file to determine whether or not the subject file sufficiently matches the reference file so that the subject can be verified.

Fingerprint matcher mechanisms are known. One such matcher is described in Wegstein, J. H., *The M-40 Fingerprint Matcher*, National Bureau of Standards Technical Note 878, U.S. Government Printing Office, Washington, DC 1975. The matcher mechanism described in the Wegstein reference employs the position of each reference minutia and subject minutia in X and Y coordinates and the angular value in degrees. As described in Wegstein, each reference is compared with each subject point, within certain limits, for each of these X, Y and angle parameters so as to provide displacement values for a difference table. Certain clusters of points on the difference table are used to provide an indication of the extent to which the subject fingerprint might be displaced or rotated relative to the fingerprint from which the reference file was obtained. Certain figures of merit or matching scores are obtained. Only if the matching score exceeds certain thresholds, is the subject fingerprint deemed to correspond with the reference fingerprint.

The utility of a matcher is a function of the speed with which it operates and its error rate. There are two types of error. A type I error is the failure to verify a match when the subject finger is indeed the same as the finger from which the reference file was obtained. This is an incorrect rejection in an access system. A type II error is the verification of a subject fingerprint which in fact is not the same as the fingerprint from which the reference file was made. This is an incorrect admission in an access system.

The value of any matcher mechanism is the extent to which the matcher contributes to increasing the speed of operation of a verification system, to reducing type I errors and to reducing type II errors.

There is a trade off between these three operating characteristics and the amount of distortion and lack of registration between the two fingerprints that are being compared which can be tolerated. A major, if not the major, problem in matching fingerprint derived data is due to the plasticity of the finger. The resultant variation in finger impression from time to time results in substantial image variation.

Accordingly, it is a purpose of this invention to provide an enhanced matcher in which an improved trade off is obtained between the characteristics of speed, type I error, type II error, and ability to accept distortion and lack of registration.

BRIEF DESCRIPTION

In brief, the matcher of this invention compares a set of subject points held in a first memory unit against a set of reference points held in a second memory unit. The matcher operates with a known type of difference table. However, in this invention each entry on the difference table is established as a lead entry in a separate Group table. Thus there is on Group table for each entry on the difference table. The Group corresponds to what is or could be a cluster.

Each Group table is composed of only one entry from the difference table associated with each reference point and that entry is the one which is closest on the difference plane to the lead entry for the Group table. Furthermore, unless the closest entry is within a certain distance of the lead entry on the difference table it is omitted from the Group table. In addition, unless the closest entry has an angular displacement which is within a threshold distance from the angular diplacement of the lead entry, it is also omitted from the Group table. Accordingly, the Group table for any lead entry has no more entries than the number of reference minutia points in the reference file.

A quality score Q is calculated for each Group table. The quality score is determined by pairing each entry on the Group table with each other entry. For each pair, a score $P_s$ is calculated which is a weighted function of the distance between the pair on the difference plane and the difference in angular displacement of the pair on the difference table. The sum of all these weighted pair scores constitutes a quality score for the Group table.

The maximum Group table quality score $Q_m$ is the matcher score. Verification is established only if the match quality score $Q_m$ exceed a certain threshold.

In particular, verification may be established only if three criteria are met. These three criteria are: (i) the number of entries on the Group table associated with $Q_m$ is greater than a first threshold, (ii) the number of entries on the Group table associated with $Q_m$ is greater than a predetermined fraction of the number of entries in the reference file, and (iii) the matcher score $Q_m$ is greater than a third threshold, which third threshold is some predetermined multiple of the total-number of minutia entries in the reference file.

The subject fingerprint minutia file which is to be compared against a reference fingerprint minutia file are both files that may be derived from an optical image of a fingerprint. The optical image may be developed from an optical scanning apparatus and technique such as that disclosed in U.S. Pat. No. 4,322,163 issued Mar. 30, 1982 and entitled Finger Identification. The minutia extracted from such an optical image may be obtained by any of a number of known techniques. Such techniques are described in Stock,, R. M., *Automatic Fingerprint Reading Proceedings of the* 1972 *Carahan Conference on Electronic Crime Countermeasures*, University of Kentucky, Lexington Ken., 1972, p. 16-28 and Banner, C. S., and Stock, R. M., *FINDER The FBI's Approach to Automatic Fingerprint Identification, Proceedings of a Conference on the Science of Fingerprints*, Home Office, London, England, 1974.

The minutia extracted are stored as a reference file or as a subject file in memory units of the automatic classification and identification equipment. Each file is a set of points. Each point has X and Y positional coordinates and an angular coordinate $\phi$. Thus each point is represented by three parameters. The matcher provides a technique for automatically comparing the parameters associated with points in the reference file with the parameters of points in the subject file. This comparison identifies clusters of points in a difference plane and difference table. The degree and extent of the cluster is a function of plasticity distortions and lack of registration between subject fingerprint and reference fingerprint. A tight cluster can be used to identify two fingerprints as the same. This is done automatically by means of a program for operating on these parameters to effect the comparisons and decisions as set forth herein.

BRIEF DESCRIPTION OF THE DRAWINGS

FIG. 2 represents a portion of a difference table generated in accordance with the teachings of this invention.

FIG. 3 represents a difference plane in which certain of the entries from a difference table are indicated schematically so as to show the clustering that may occur in a given situation.

FIG. 4 represents a Group table for the first lead entry of the FIG. 1 difference table.

DESCRIPTION OF THE PREFERRED EMBODIMENT

The matcher mechanism provides a quality score $Q_m$. The matcher score provides an indication of how well the set of minutia of a subject fingerprint image matches the reference set of minutia.

A subject fingerprint image may differ from the reference fingerprint image even though both are taken from the same finger of the same inidividual. Displacement and rotation of the platen causes some of these differences. Differences are also due to the plasticity of the finger which results in some change in the configuration of the minutia points as a function of changes in the amount of force and the direction of the force applied by the individual when placing his or her finger on a platen. The condition of the finger varies from day to day and is a function of recent environment and use. The result is that the set of minutia points from a subject image usually differ from the set of points in a reference file, even though the two fingerprints are from the same finger.

To provide a figure of merit for making a decision on verification, a matching mechanism is used. Associated with each minutia are X and Y coordinates and an angle direction. A matcher centers around the establishment of a difference table relating to these three identifying parameters and the processing of values in the difference table. In connection with this matcher invention, reference is made to a difference table in addition to a difference plane because the difference in the direction of the minutia points being compared will be considered as well as their displacement on a two dimensional plane.

The two sets of minutia points to be compared, the reference set R and the subject set S, may be derived from an image produced by an optical scan of a fingerprint such as that disclosed in U.S. Pat. No. 4,322,163. The fingerprint image thus provided may be a binary image composed of a number of picture elements (pixels) that permits identification of the standard minutia, specifically the line endings and line bifurcations. The matcher mechanism described herein treats each such minutia point as a point and makes no distinction between a line ending minutia point and a bifurcation minutia point. The set of minutia points involved may be extracted from the image by any one of a number of mechanisms. Indeed, the matcher mechanism of this invention does not require that the set of points involved be minutia points. All that is required is that the set of points is deemed to be unique to the fingerprint of the individual involved so that a unique identification may be provided. Accordingly, it should be understood herein with respect to the disclosure and the scope of the claims, that reference to identification points is not necessarily limited to minutia identification points.

Figure 1:
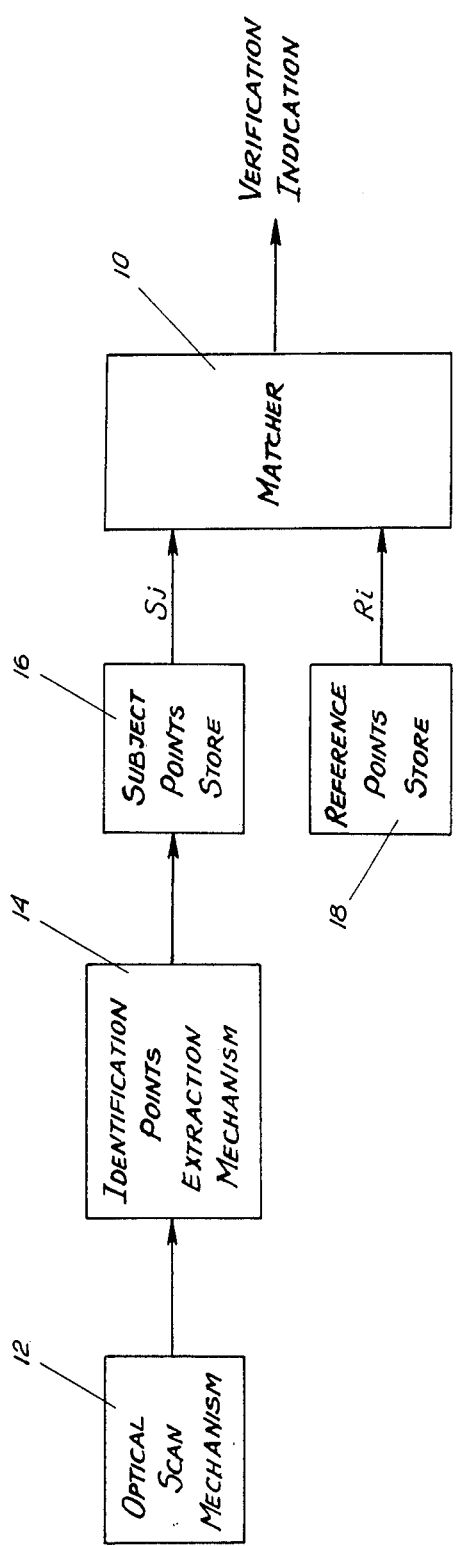
FIG. 1 is a block diagram illustrating the relationship of the matcher mechanism of this invention to the equipment that provides the set of subject points and the set of reference points.
Figure 10:
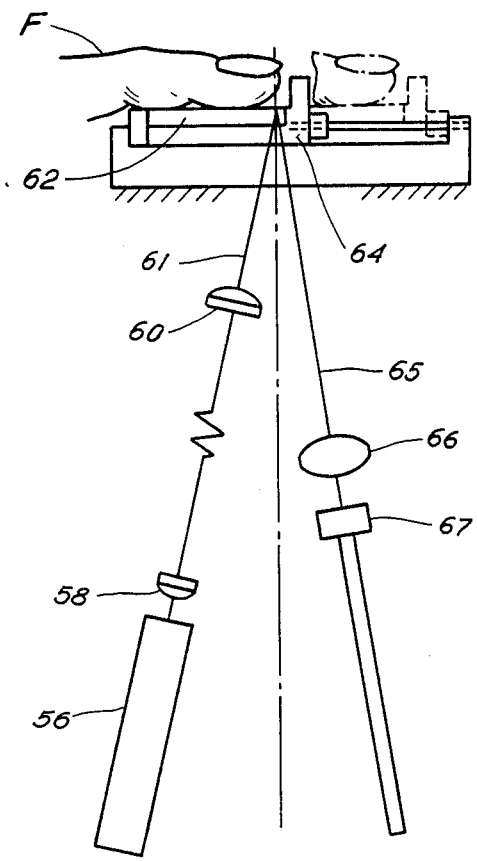
FIGS. 10 and 11 illustrate an optical scanning technique used with the verification technique of this invention.
Figure 11:
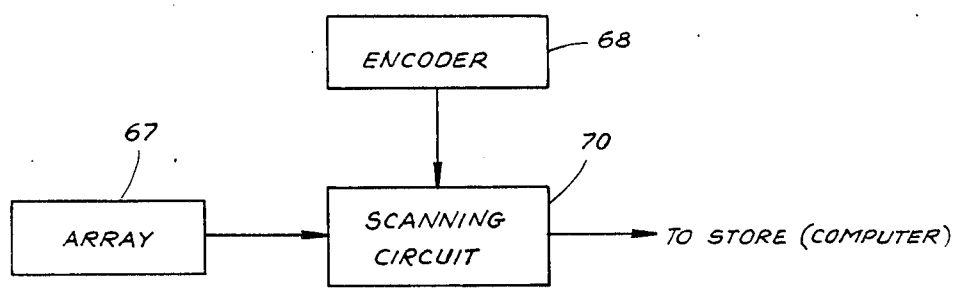

In broad terms, FIG. 1 illustrates the relationship of the matcher 10 of this invention to the equipment with which it may be associated. The optical scan mechanism 12, such as that described in the reference U.S. Pat. No. 4,322,163 and shown in more detail in FIGS. 10 and 11, provides a binary image, for which the identification points extraction mechanism 14 serves to extract a set of points that identify the fingerprint involved. The set of subject points are maintained in a subject point member store 16 so that they can be compared by the matcher 10 with a set of points in a reference point memory store 18. Thus the matcher 10 compares the contents of the two memory units 16 and 18 in the manner described hereinafter to come up with a score which indicates verification. The set of points in the reference point store 18 may be determined in any fashion. However, for purpose of minimizing both the type I and type II errors, it is preferable that the set of points in the reference store 18 be derived from the same mechanism which derives the set of points in the subject store 16.

The reference points R and subject points S are stored in memory units 16 and 18 by three parameters, namely the X value, Y value and angle value. To facilitate comparison, both R and S points are stored in Y value order. Thus, $R_1$ has the lowest Y value of any reference point, $R_2$ has the next Y value, and so forth. By so ordering in terms of Y values, it becomes possible, as shown in FIG. 4, to include a loop routine which speeds up the comparisons between R and S points.

THE DIFFERENCE TABLE

A difference table is created based on a comparison of the set of minutia points in the reference file and the set of minutia points from the subject image. Each reference point $R_i$ is compared with each subject point $S_j$ in establishing the table. No distinction is made between line ending points and bifurcation points. Each minutia is treated as a point in a three parameter matrix. FIG. 2 illustrates a portion of such a difference table.

For each comparison of a reference point and a subject point, various entries are made in the table. An entry $\Delta X$ is made equal to the displacement between these two points along the X axis of the image plane.

Another entry $\Delta Y$ is made equal to the displacement along the Y axis. A third entry $\Delta\phi$ (not shown in FIG. 2) is made indicating the angular difference between the two points. The $\Delta X$ and $\Delta Y$ entries are the number of pixels between the two points. The $\Delta\phi$ difference is in degrees. A plot of all $\Delta X$ and $\Delta Y$ entries creates the difference plane.

The number of entries in the difference table of this invention is restricted in that for a given reference point $R_i$ certain subject points $S_j$ are not included. In one embodiment, the subject points $S_j$ that are excluded from the difference table comparison with a given reference point are where either (i) the subject point $S_j$ is outside of a 61×61 pixel box centered on the reference point $R_i$; or (ii) where the angle of the subject point $S_j$ is outside of a band of plus or minus 22.5 degrees around the angle for the reference point. In this fashion, the number of entries in the difference table is somewhat limited.

The FIG. 2 difference table is a representation of the portion of the typical difference table that might be developed with the apparatus of this invention. Each entry is given a line number. Each reference point $R_1$ is compared with each subject point $S_j$ which is within the 61×61 pixel box centered on the reference point $R_i$. The X axis and Y axis displacements, $\Delta X$ and $\Delta Y$ respectively, are entered in the difference table. In addition, in one preferred embodiment, the difference in the ridge flow matrix angles of the two points $R_i$ and $S_j$ being compared is entered in an additional column which is not shown in the FIG. 2 difference table. Furthermore, in a practical embodiment, there would be many more entries. The difference table is ordered by the Y value of the reference points. Because of the ordering of the R and S points in the memories 16 and 18 it is possible, as shown in FIG. 4, to include a loop routine which speeds up the comparison. Any subject point $S_j$ with a Y value below that of the window set up on a given $R_i$, need not be compared with any subsequent $R_i$ points. Thus a determination that the Y value of an $S_j$ is below the window means that the next $S_j$ point can be immediately reviewed.

As shown in FIG. 2, in the difference table, the $S_j$ points are ordered within each sub-group of $R_i$ points by virtue of the absolute magnitude of $\Delta Y$.

Figure 5:
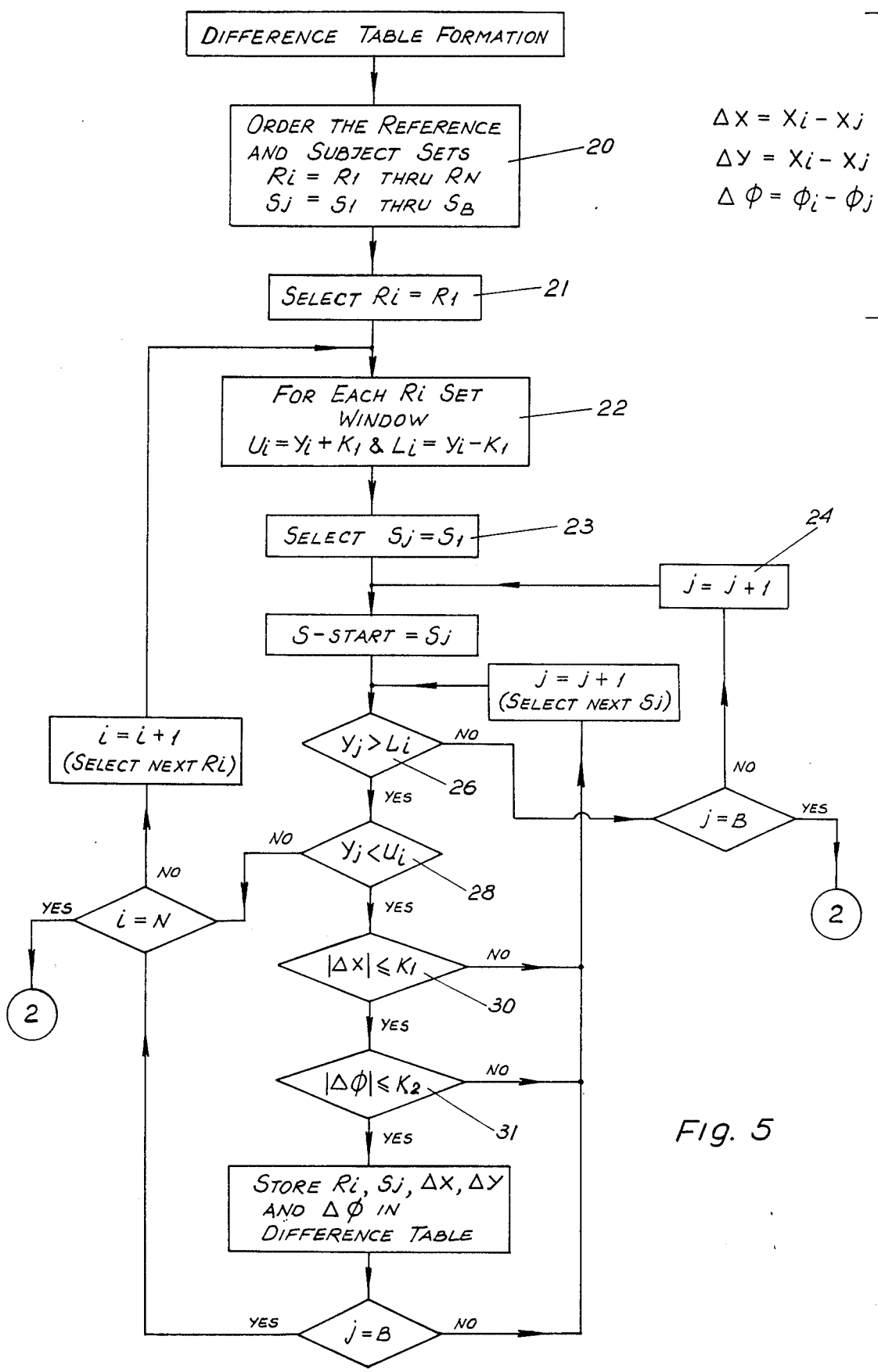
FIG. 5 is a flow chart representing the development of the difference table.

FIG. 5 illustrates a flow chart for developing the difference table of FIG. 2. As indicated by the function box 20, the reference set $R_i$ and the subject set $S_j$ are ordered in terms of their Y coordinate value. This ordering facilitates a speedier processing. The first R (namely $R_1$) is used to start as indicated by the function box 41. Any subject point $S_j$ which is outside of the 61×61 pixel box centered on $R_1$ is not coupled with $R_1$ in the difference table. Thus, the function box 22 establishes a window in which the limits of the Y value for the subject points $S_j$ is $K_1$ pixels above that of the Y value for the reference point and $K_1$ pixels below the Y value of the reference point. All subject points $S_j$ must have a value within that window. In the embodiment when the window is 61×61 pixels, $K_1$ is 30 pixels. In that embodiment, the field of the image is 256 by 256 pixels and represents an object fingerprint with 0.075 mm. (3 mils.) per pixel resolution. The optimum value for this window, like all such parameters herein, is a function of the resolution of the image.

The first subject point $S_j$ is the first in order namely $S_1$ as indicated by the function box 23.

The speed up procedure which involves the loop that includes function box 24 is a known technique. Because of the window, there is no need to further compare a subject point $S_j$ that has a Y value below the window against any other reference points $R_i$, since the reference points are ordered by Y value.

The decision boxes 26 and 28 determine the programming within the limits of that window. The decision box 30 with the value $K_1$ (equal to 30 in one embodiment) assures that the X displacement values are within the 61×61 pixel window. The decision box 31 assures that the angular displacement value of each entry on the difference table is within the 22.5 degrees "window".

FIG. 3 is not intended to represent the relationship between the $R_i$ and $S_j$ points set out in FIG. 2. FIG. 3 provides an indication of how a set of difference table entry points would look in a difference plane where the reference file and subject file are derived from the same finger and the displacement between the subject finger and the reference finger is slight. In such a circumstance, assuming five points, there will be one tight cluster of five points. Clearly, identification of this cluster is an aid in evaluating the match. The group table technique of this invention is an improved technique for evaluating that match. As indicated in FIG. 3, non-matching points will be distributed all over the plane.

GROUP TABLE INFORMATION (FIGS. 4 AND 6)

For each line entry on the difference table (that is, for each comparison of a reference point $R_i$ and a subject point $S_j$) an associated Group of difference table entries is established. In connection with the following definition of a Group it should be kept in mind that the members of each Group are not exclusive. Thus, an individual difference table line entry can be a member of more than one Group.

It is convenient to define all difference table line entries associated with a given reference point $R_i$ as a Reference Set (RS) of entries on the difference table. Thus, there can be no more Reference Sets in the difference table than there are reference points.

The line entry that is the basis for forming a Group is termed the lead entry for the Group. It should be kept in mind that since a Group is formed for each difference table entry, each difference table entry will be a lead member of one Group.

With these definitions of (RS) and lead entry in mind, the Group of difference table entries associated with each lead entry is that member of each RS which is closest on the difference plane to the lead entry. Thus, only one line entry from each RS can be in any one Group. As a second constraint on the members of the Group, a line entry qualifies for a Group only if its position on the difference plane is within a box of 18×18 pixels on the difference plane erected around the lead member of which the Group is being established. A third constraint, that may be employed, states that a line entry qualifies for the Group only if its $\Delta\phi$ value is within a predetermined range of the $\Delta\phi$ value of the lead member of the Group.

Accordingly, the number of difference table lines entries in the Group associated with a given line entry can be no greater than N, the total number of reference points. Because of the 18×18 window and the $\Delta\phi$ window, if the latter is used, the Group may have fewer members than N. The number of members of the Group is designated GC herein.

FIG. 4 represents one Group table that is derived from the difference table of FIG. 2. More particularly, the Group table of FIG. 4 is a Group table associated with the first entry on the FIG. 2 difference table. This first entry is considered the lead entry for the FIG. 4 Group table. From each referece set RS, that difference table entry is selected which is closest on the difference plane to the position of the lead entry on the difference plane. Accordingly, there are seven entries on the Group table of FIG. 4 representing the seven reference sets RS in the difference table of FIG. 2. If any of the Group table entries shown in FIG. 4 were outside of a 18×18 pixel box centered on the lead entry, it would be deleted from the FIG. 4 Group table.

Similarly, if the $\Delta\phi$ values were included in the embodiment the Group table could be further purged of any line entry member where the $\Delta\phi$ value is not within a predetermined range of the $\Delta\phi$ value of the lead entry.

Although a preferred embodiment of this invention is described in which the angular displacements of the points from the subject file and reference file are incorporated in the tables and in determining the quality score, it should be understood that the matcher mechanism of this invention can be implemented solely by reference to the X and Y displacements. One embodiment of the invention which has been tested and found to work involves only the difference plane considerations. Accordingly, to simplify the presentation in the FIGS., the angelon displacement comparisons eliminated from the showing of FIGS. 2, 4, 6 and 7. However, as shown in FIG. 5, a $\Delta\phi$ criterion is used in setting up the difference table in all cases.

Figure 6:
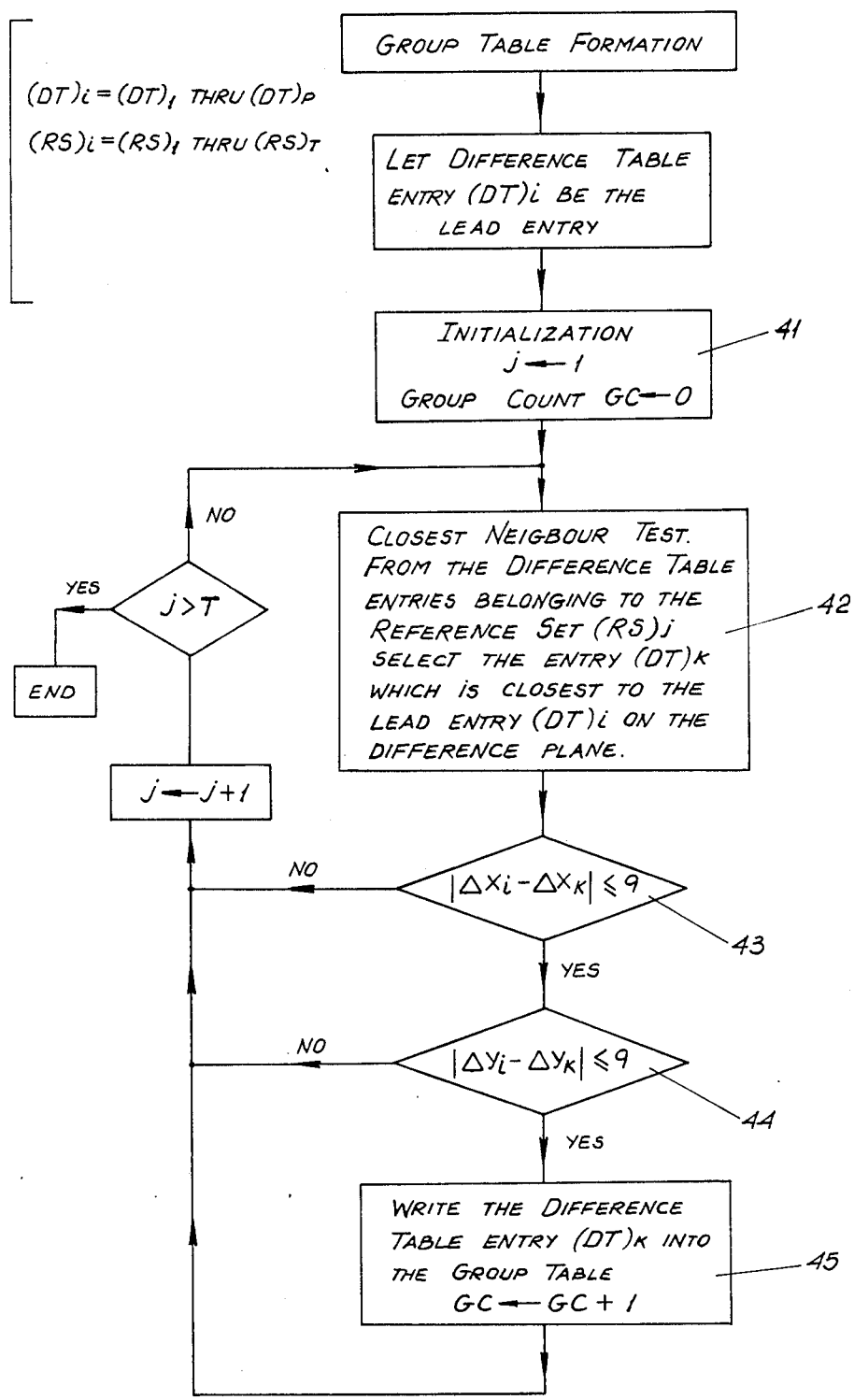
FIG. 6 is a flow chart illustrating the development of a Group table.

FIG. 6 illustrates the formation of the Group tables from the difference table. As indicated by the function box 40, each Group table has a lead entry and each entry on the difference table $(DT)_i$ is a lead entry for a separate Group table. Each reference set $(RS)_j$ is treated as a separate grouping. Accordingly, as shown at box 41, the appropriate initialization $j=1$ is set for $(RS)_i$. Since only one member from each $(RS)_j$ is to be selected and that is to be the closest neighbor to the lead entry, such closest neighbor from each $(RS)_j$ is selected, as indicated by function box 42. As indicated by the two decision boxes 43, 44 the closest neighbor is tested for whether or not it is within the 18×18 pixel window. Only if it is, is it written into the Group table. FIG. 6 does not illustrate the elimination for $|\Delta\phi i - \Delta\phi j| \leq 2$. That would entail an additional decision box where that criteria is used. After the closest entry for a particular Reference Set $(RS)_j$ has been selected, the next Reference Set on the difference table is addressed and the procedure repeated until the last Reference Set $(RS)_N$ is tested. Each Group Table requires a count of the number of entry lines and that Group Table count GC is established by the initialization and incrementing, shown in FIG. 6 in function boxes 41 and 45.

ESTABLISH Q SCORE FOR EACH GROUP (FIG. 7)

A Quality score Q is calculated for each group and that Q score is attributed to the lead entry of the group.

The Q score for each group involves a weighted relationship between the relative displacements ($\Delta X, \Delta Y$ and $\Delta\phi$) of the various line entries in the Group associated with the lead member. Each member of a Group is paired with each other member of that same Group. For example, if there are eleven members of a Group associated with the third entry in the difference table, there will be 55 combinations or pairs between those eleven Group members.

For each of these 55 pairs, a pair score $P_s$ is generated. The pair score takes into account the distance on the difference plane between the two members of the pair and may also take into account the differential angular displacement between the two of the pair.

More specifically, a value $P_d$ is calculated from the sum of the absolute value of the difference between the $\Delta X$ values for the two members of the pair and (ii) the absolute value of the difference between the $\Delta Y$ values for the two members of the pair. A value $P_a$ may also be calculated as the absolute value of the difference between the $\Delta\phi$ values of the two members of the pair. Thus:

$$P_d = |\Delta X_j - \Delta X_R| + |\Delta Y_j - \Delta Y_R|$$

$$P_a = |\Delta\phi_j - \Delta\phi_k|$$

Then, a weighted distance value $W_d$ is calculated as a magnitude equal to the value "9" less the distance value $P_d$. A weighted angular value $W_a$ is also calculated equal to the value "2" less the angular differential value $P_a$. The $W_d$ value is used only if it is positive. Thus all $P_d$ values of "9" or more are elimated. The $W_a$ value is used only if both $W_d$ and $W_a$ are positive. Thus:

$$W_d = 9 - P_d \text{ and}$$

$$W_a = 2 - P_a$$

In one embodiment, the angle of the minutia points involved are determined by a slit angle technique which involves angle values and increments of 11.25 degrees. That is, there are 32 separate angle values in a circle. Each of these angle increments are given an angle value from 0 to 31. Accordingly, in that embodiment the angle values are not measured in degrees but rather in one of these 32 angle values and the programming involved counts each increment as an angle value of "one". Accordingly, the formulations set forth herein for the $W_a$ values are in terms of these 32 incremental angle values, specifically, the maximum $W_a$ value of "2" corresponds to 22.5 degrees.

Using only positive values for $W_d$ and $W_a$, the Score $P_s$ for the pair involved in the sum of $W_d$ and $W_a$.

$$P_s = W_d + W_a$$

Finally, the Q score for the lead member of the Group is based on the sum of these pair scores $P_s$.

$$Q_i = \Sigma P_s$$

In this fashion, a Q score is provided for each entry in the difference table.

It should be noted that the Q score is based on a calculation involving the members of the Group and is a value or score that is attributed to the lead member of the Group.

Figure 7:
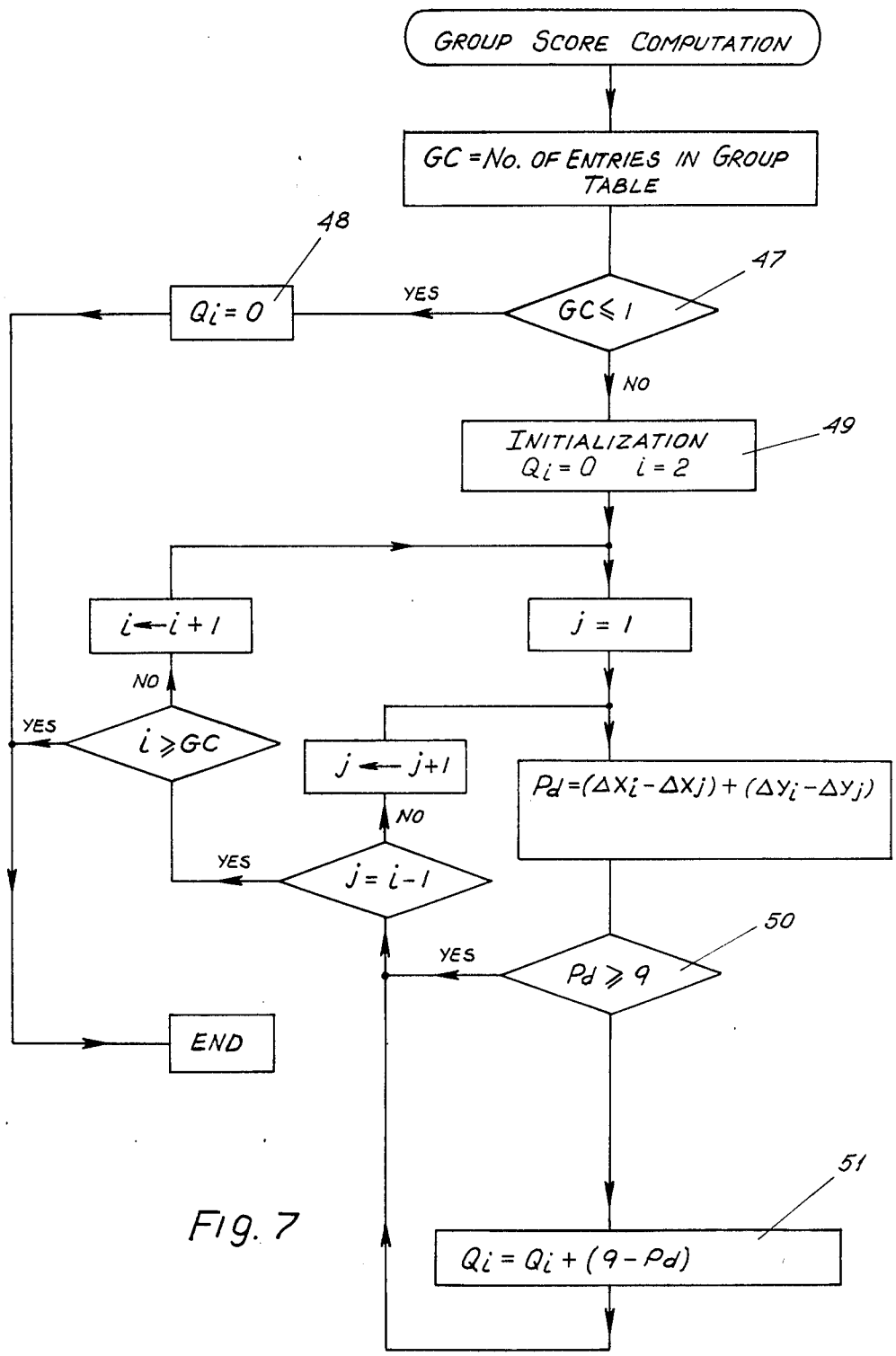
FIG. 7 illustrates a flow chart by which the quality score Q is computed for each Group table.

FIG. 7 is a flow chart representing the above calculations for an embodiment in which the $\Delta\phi$ differentials are not employed and thus the $P_a$ contribution to the Q score is not involved. As shown in FIG. 7, the group current GC has to be established. If it is one, then no $Q_i$ is calculated for tha group as indicated at decision box 47 and function box 48. If the Group has more than one line entry, the initialization function (box 49) sets i=2 so that the pairing of each entry i with each other entry j will be properly ordered. The decision box 50 assumes that the pair value is weighted more heavily, as the numbers of the pair are closer to each other. The Q score for the particular group (i.e. the score $Q_i$) is the sum of the weighted pair scores as shown in function box 51.

Figure 8:
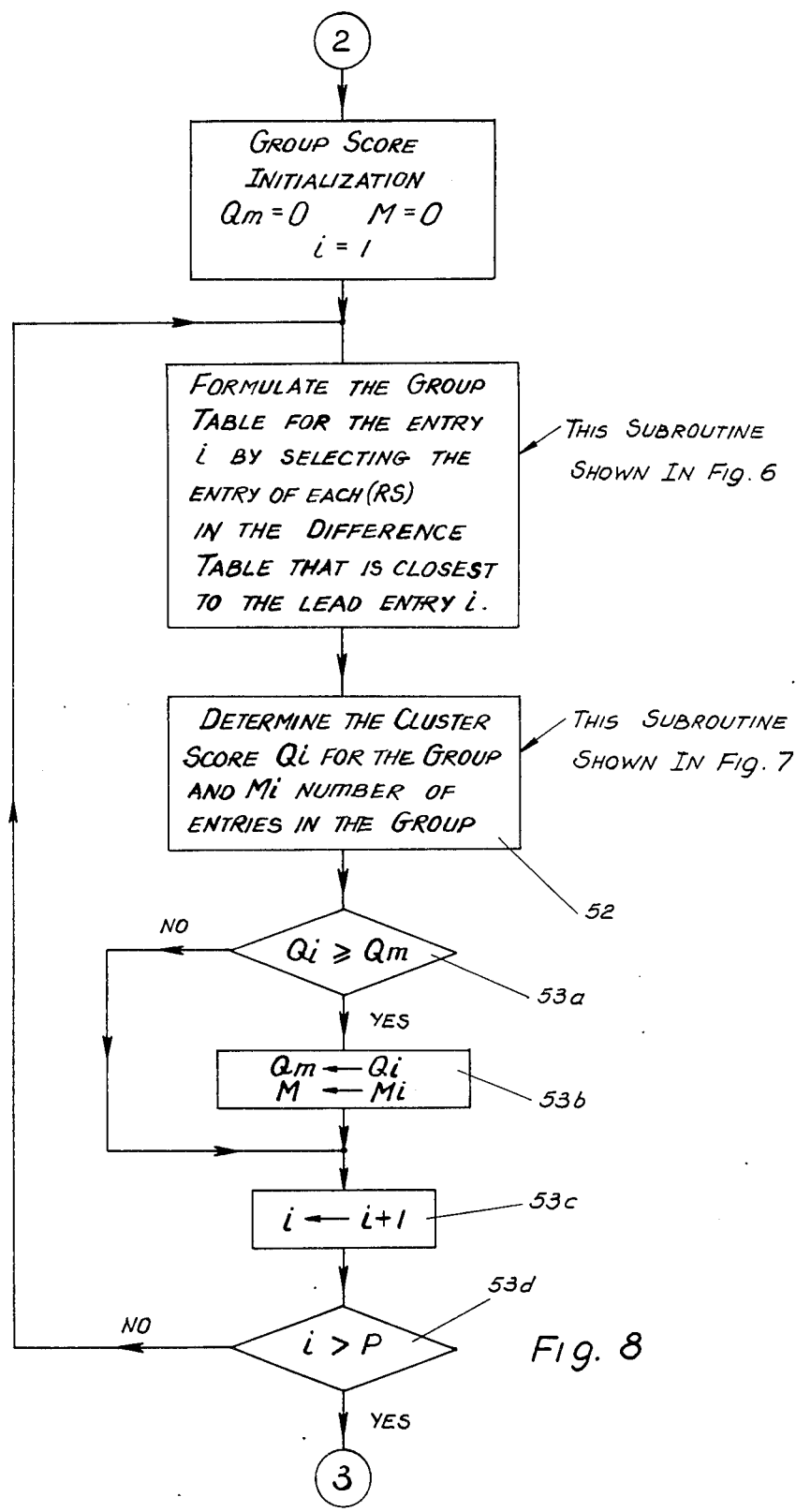
FIG. 8 is a flow chart representing the determination of the maximum group quality score $Q_m$.

ESTABLISHED $Q_m$ SCORE FOR MATCHER (FIG. 8)

The highest Q score is the score $Q_m$ for the matcher. The difference table line entry that corresponds to the highest score $Q_m$ is deemed the center of the tightest cluster. The $\Delta X, \Delta Y$ and $\Delta \phi$ values in that line of the difference table are deemed to represent the shift and rotation on the image plane between the subject image and the reference image.

The number of line entries in the Group having the highest score $Q_m$ is designated by the letter M. The output of the matcher is the value of $Q_m$ and the value of M. These matcher outputs M and $Q_m$ are used to provide verification of the input image against the reference file.

This Q score is a quality value that is associated with each Group and serves to provide an indication of how close is the match between the set of subject points and the set of reference points. The highest Q score is used for the matcher because that represents essentially the tightest cluster. The ability of this Q score to discriminate between a subject set of points which derive from the same finger as the reference set of points and a subject set of points which are not derived from the same finger determines the value of the matcher. The Group table approach of this invention is what provides improved Type I and Type II errors. In particular, noise which weakens this ability to discriminate is reduced by those steps which limit the members of each Group table. Thus purging each Group table of any members which deviate from the lead entry more than a certain distance on the difference plane, or more than a certain difference in angular displacement, aids in reducing noise. Perhaps, more importantly, the step of limiting each Group table to a single difference table entry for each reference point and requiring that entry to be the one which is closest on the difference plane to the lead entry, aids to provide a unique cluster of Group table members for calculation of the quality score Q. It is these features in particular which tend to greatly improve the Type II error.

FIG. 8 illustrates the over all Group table formulation and scoring of this invention with the output of the function box 52 being the output of FIG. 7. Then, as shown in FIG. 8, the matcher score or highest Group cluster score $Q_m$ is determined by a comparison of the individual Group scores $Q_i$ through the P Groups involved, as indicated by the boxes 53a through 53d. The maximum $Q_i$ is stored as the matcher score $Q_m$ as the value M (the number of entries $M_i$ in the Group having the $Q_m$) and N (the number of entries in the difference table).

VERIFICATION (FIG. 9)

It should be recognized in connection with verification, that if the subject image were identical to the reference image (with each minutia point in exact position relative to one another) then the value of M (the number of entries in the Group table) would equal N (the number of minutia points in the reference file). The value of each paired score $P_s$ would be a maximum and equal to "11" (or "9" if the angle differential were not employed). Accordingly, the value of $Q_m$ would be a maximum. Specifically, the number of pair scores $P_s$ is one-half of N (N-1). Thus with a perfect match, the sum of all $P_s$ values would equal (11/2) N(N-1). Accordingly, the maximum possible value for $Q_m$ is a function of N.

With the above in mind, it may be appreciated that one useful verification routine requires that the value of M be greater than a first threshold, that M be greater than a predetermined percentage of N, and also that the value of $Q_m$ be greater than a second threshold which is a function of N.

Figure 9:
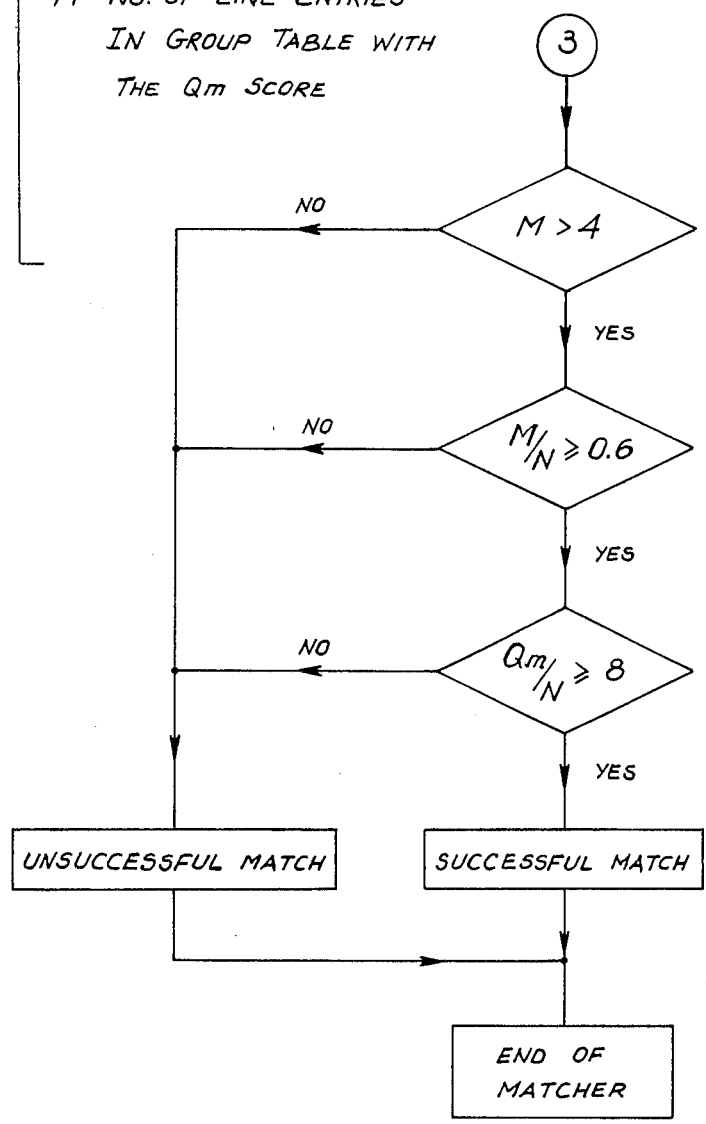
FIG. 9 is a flow chart representing the matcher decision strategy using the maximum group score $Q_m$.

In particular, in one embodiment, as shown in FIG. 9, verification is established only if each of the following three criteria are met: (i) M is greater than 4, (ii) M is equal to or greater than 60% of N, and (iii) $Q_m$ is equal to or greater than 4N.

FIGS. 10 and 11 indicate a known mechanism 12 optically scanning the fingerprint. Since it is described in the issued U.S. Pat. No. 4,332,163, the disclosure herein need not be in great detail. Suffice it, therefore, to say that a beam of light such as may be provided by a laser 56 is approximately collimated by lenses 58 and 60 to provide the interrogating beam 61. A substantially transparent platen 62 is provided as a base on which an individual finger may be placed. The platen 62 is mounted in a movable carriage 64 which permits moving the finger forward across the interrogating beam 61. As a consequence, the pattern of ridges and valleys provided at the back surface of the platen 62 causes the reflected light beam 65 to be modulated with fingerprint information. A focusing lens 66 focuses the image carried by the reflected light beam onto a linear array 67 of photo responsive diodes.

An encoder element 68 which is affixed to the carriage 64 responds to movement of carriage 64 to produce a synchronizing signal each time the carriage moves a predetermined distance (0.02 mm in one embodiment) the snychronizing signal causes the scanning circuit 70 to sequentially interrogate each of the photodiodes comprising the array 67. Thus the output of the scanning circuit 70 is a train of pulses for each scan line. Each pulse represents a picture element or pixel. In one embodiment, the larger magnitude pulses represent ridge pixels and are referred to herein with the value "one" and the smaller magnitude pulses represent valley zone pixels and are referred to herein as having a "zero" value. In connection with the present invention, the preferred embodiment of the platen 62 is that shown in FIG. 8 of U.S. Pat. No. 4,322,163 and more particularly is a transparent substrate having an anti-reflective coating on its finger touching surface.

What is claimed is:

1. In the method of matching a set of subject identification points against a set of reference identification points involving a matcher mechanism that employs a difference table, the improvement comprising the steps of:

optically scanning the surface of an object that is deemed to be a subject input to provide said set of subject identification points substantially unique to the object being scanned, for each line entry on the difference table as a lead entry, providing a group of difference table line entries, limiting each group so provided to no more than one line entry for each of said reference identification points, for each of said groups, providing a quality value determined by a weighted relationship between the relative displacements of the various line entries in the group, selecting the most significant group quality value, and verifying a match between the set of subject points and the set of reference points as a function of the relative magnitude of the most significant quality value as compared to the number of identification points in a first one of said sets.

2. The method of claim 1 wherein said step of providing each of said groups involves selecting that one line entry associated with each reference point which is closest on the difference plane to the lead entry for that group.

3. The method of claim 2 wherein each of said groups, all line entries within a group are within a predetermined window on the difference plane around the lead line entry for that group.

4. The method of claim 3 wherein said first one of said sets, used in said step of verifying, is said set of reference identification points.

5. The method of claim 4 wherein said surface of an object is a finger surface or a fingerprint surface.

6. The method of claim 3 wherein said weighted relationship involves determining a weighted proximity value between each pair of line entries in the group involved.

7. The method of claim 6 wherein said weighted proximity value is based on relative displacement on the difference plane of each pair.

8. The method of claim 7 wherein said weighted proximity value if further based on the relative angular displacement of each pair.

9. The method of claim 6 wherein said step of selecting the most significant group quality value involves selecting the maximum weighted proximity value.

10. The method of claim 3 wherein said surface of an object is a finger surface or a fingerprint surface.

11. The method of claim 2 wherein said surface of an object is a finger surface or a fingerprint surface.

12. The method of claim 1 wherein, in each of said groups, all line entries within a group are within a predetermined window on the difference plane around the lead line entry for that group.

13. The method of claim 1 wherein said first one of said sets, used in said step of verifying, is said set of reference identification points.

14. The method of claim 13 wherein said step of verifying further includes requiring that the number of line entries in the group from which the most significant group quality value is obtained exceeds a predetermined value that is a function of the number of reference identification points.

15. The method of claim 14 wherein said step of verifying further includes requiring that the number of line entries in the group from which the most significant group quality value is obtained exceeds a predetermined value.

16. The method of claim 13 wherein said step of verifying further includes requiring that the number of line entries in the group from which the most significant group quality value is obtained exceeds a predetermined value.

17. The method of claim 1 wherein said weighted relationship involves determining a weighted proximity value between each pair of line entries in the group involved.

18. The method of claim 17 wherein said weighted proximity value is based on relative displacement on the difference plane of each pair.

19. The method of claim 18 wherein said weighted proximity value is further based on the relative angular displacement of each pair.

20. The method of claim 19 wherein said weighted relationship involves determining a weighted proximity value between each pair of line entries in the group involved.

21. The method of claim 20 wherein said weighted proximity value is based on relative displacement on the difference plane of each pair.

22. The method of claim 21 wherein said weighted proximity value is further based on the relative angular displacement of each pair.

23. The method of claim 22 wherein said step of selecting the most significant group quality value involves selecting the maximum weighted proximity value.

24. The method of claim 20 wherein said step of selecting the most significant group quality value involves selecting the maximum weighted proximity value.

25. The method of claim 19 wherein said step of selecting the most significant group quality value involves selecting the maximum weighted proximity value.

26. The method of claim 17 wherein said step of selecting the most significant group quality value involves selecting the maximum weighted proximity value.

27. The method of claim 1 wherein said step of verifying further includes requiring that the number of line entries in the group from which the most significant group quality value is obtained exceeds a predetermined value that is a function of the number of identification points in said first set.

28. The method of claim 27 wherein said step of verifying further includes requiring that the number of line entries in the group from which the most significant group quality value is obtained exceeds a predetermined value.

29. The method of claim 1 wherein said step of verifying further includes requiring that the number of line entries in the group from which the most significant group quality value is obtained exceeds a predetermined value.

30. The method of claim 1 wherein said surface of an object is a finger surface or a fingerprint surface.

31. A matcher improvement for matching a set of subject identification points against a set of reference identification points employing a difference table, comprising:

first memory means for storing a set of subject identification points, second memory means for storing the set of reference identification points, differencing means coupled to the outputs of said first and second storage means to provide a set of difference table entries, means for automatically grouping the line entries on said difference table into a series of group table, each line entry on said difference table providing a lead entry for a different one of said group tables, line entries on said difference table being available for inclusion in more than one group table, each of said group tables having no more than one line entry for each of said reference identification points, means to provide a quality value for each group so formed by virtue of a weighted proximity relationship between each pair of entries in a group, means to select the most significant group quality value, and means to verify a match between the set of subject points and the set of reference points as a function of the relative magnitude of the most significant group quality value as compared to the number of identification points in a first one of said sets.

32. The improvement of claim 31 wherein that one line entry for each reference point is the one that is closest on the difference plane to the lead entry for the group.

33. The improvement of claim 32 wherein all line entries within a group are within a predetermined window on the difference plane around the lead line entry for that group.

34. The improvement of claim 33 further comprising: second means to further verify a match between the set of subject points and the set of reference points as a function of the number of line entries in the group from which the most significant group quality value is obtained exceeding a predetermined value based on the number of identification points in said first set.

35. The improvement of claim 34 further comprising: third means to further verify a match between the set of subject points and the set of reference points as a function of the number of line entries in the group from which the most significant group quality value is obtained exceeding a predetermined value.

36. The improvement of claim 33 wherein said first one of said sets, is said set of reference identification points.

37. The improvement of claim 36 further comprising: second means to further verify a match between the set of subject points and the set of reference points as a function of the number of line entries in the group from which the most significant group quality value is obtained exceeding a predetermined value based on the number of identification points in said first set.

38. The improvement of claim 37 further comprising: third means to further verify a match between the set of subject points and the set of reference points as a function of the number of line entries in the group from which the most significant group quality value is obtained exceeding a predetermined value.

39. The improvement of claim 32 wherein said most significant group quality value is the maximum weighted proximity value.

40. The improvement of claim 32 further comprising: second means to further verify a match between the set of subject points and the set of reference points as a function of the number of line entries in the group from which the most significant group quality value is obtained exceeding a predetermined value based on the number of identification points in said first set.

41. The improvement of claim 40 further comprising: second means to further verify a match between the set of subject points and the set of reference points as a function of the number of line entries in the group from which the most significant group quality value is obtained exceeding a predetermined value.

42. The improvement of claim 31 wherein all line entries within a group are within a predetermined window on the difference plane around the lead line entry for that group.

43. The improvement of claim 42 wherein said most significant group quality value is the maximum weighted proximity value.

44. The improvement of claim 31 wherein said first one of said sets, is said set of reference identification points.

45. The improvement of claim 44 wherein said most significant group quality value is the maximum weighted proximity value.

46. The improvement of claim 44 wherein said most significant group quality value is the maximum weighted proximity value.

47. The improvement of claim 31 wherein said most significant group quality value is the maximum weighted proximity value.

48. The improvement of claim 31 further comprising: second means to further verify a match between the set of subject points and the set of reference points as a function of the number of line entries in the group from which the most significant group quality value is obtained exceeding a predetermined value based on the number of identification points in said first set.

49. The improvement of claim 48 further comprising: third means to further verify a match between the set of subject points and the set of reference points as a function of the number of line entries in the group from which the most significant group quality value is obtained exceeding a predetermined value.

* * * * *